No. 691,346. Patented Jan. 21, 1902.
A. BARR.
PIPE COUPLING.
(Application filed Oct. 9, 1900.)
(No Model.)

Witnesses

Inventor
Alexander Barr.
By Knight Bros
attorneys

UNITED STATES PATENT OFFICE.

ALEXANDER BARR, OF PARTICKHILL, SCOTLAND.

PIPE-COUPLING.

SPECIFICATION forming part of Letters Patent No. 691,346, dated January 21, 1902.

Application filed October 9, 1900. Serial No. 32,506. (No model.)

*To all whom it may concern:*

Be it known that I, ALEXANDER BARR, engineer, of 6 Hillend Gardens, Partickhill, in the county of Renfrew, Scotland, have invented certain new and useful Improvements in Pipe-Couplings, of which the following is a specification.

This invention has mainly for its object by an inexpensive and efficient means the connecting or joining of metallic pipes to articles or receptacles made of glass, pottery-ware, or other more or less fragile material of a like nature.

Figure 1:
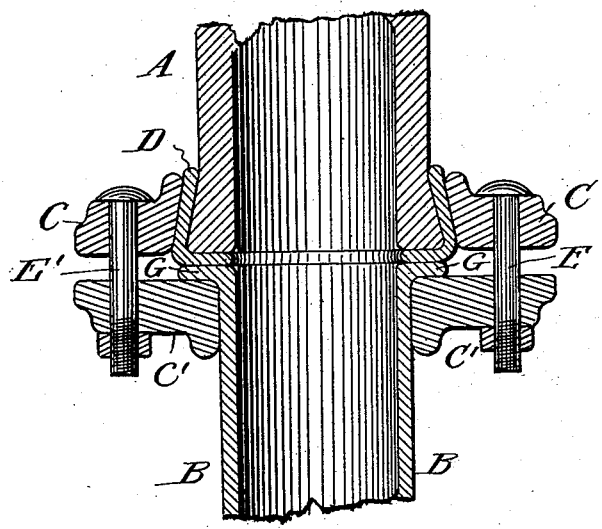
Figure 2:
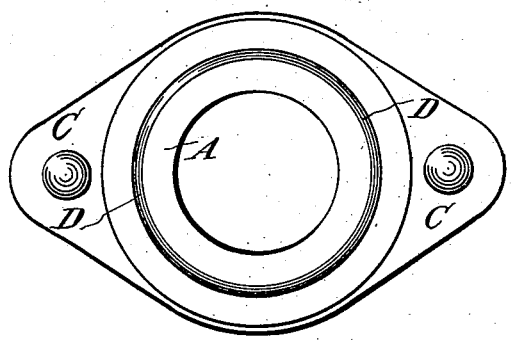

Figure 1 is a vertical section through my coupling and two pipes. Fig. 2 is a top plan view of the same.

In carrying out my invention as applied to such articles as water-closet basins, wash hand-basins, and the like, reference being made to the accompanying drawings, I form the short pipe or nozzle A, which is a part of the receptacle for the supply or discharge of the same, of an increased outside diameter at the point of connection with the metallic pipe B. I also employ a metal collar or gland C, the inside diameter of which permits of the aforesaid nozzle A being freely passed through it. After having passed the nozzle A through the collar or gland C, I pass the nozzle A into a short piece of india-rubber pipe or ring D or other suitable material, which having thus increased the outside diameter of the nozzle prevents a complete return of the gland. The metallic pipe B to be connected being formed of a more or less like configuration to the said nozzle A and also provided with a similar gland C' and rubber piece the joint or connection can then be securely formed by drawing the two glands together by means of two or more bolts or nuts E E'. A rubber or other packing ring may be used between the connecting-surfaces, or in lieu thereof a portion of the rubber pipe or ring may be turned inward at point of contact. When the pipe to be connected is of lead or other more or less soft material, the inside diameter of its gland may be of a diameter approximating the outside diameter of the pipe and the latter flanged outward, as at G, after the gland has been put onto the pipe in accordance with usual practice.

This form of joint may also be used for quickly connecting or disconnecting of pipes, whether of similar or dissimilar material, the ends of which being formed with a distended diameter and having glands which are free to pass over said distention and prevented from completely returning by increasing the outside diameter of the ends of the pipe or pipes by means of a pipe or ring of rubber or other soft material being put thereon.

I claim—

In a pipe-coupling the combination with a pipe having an increased outside diameter at one end, the gland having a decreasing interior the smallest diameter of which is greater than the greatest outside diameter of the pipe whereby the gland may be slipped over the end of said pipe, a rubber packing secured around and over the end of the pipe thereby preventing the gland from passing over the end of the pipe, in combination with another pipe having a flange on its end, a gland secured around the second-named pipe and clamping-bolts connecting the two glands.

In testimony whereof I affix my signature in the presence of two witnesses.

ALEXANDER BARR.

Witnesses:
JOHN SIDDLE,
EDITH MARY EDMONDSTONE.